United States Patent [19]
King

[11] 3,786,700
[45] Jan. 22, 1974

[54] MACHINE FOR FINISHING PARTS
[76] Inventor: David P. King, 9835 Telegraph Rd., Erie, Mich. 48133
[22] Filed: Jan. 13, 1972
[21] Appl. No.: 217,568

[52] U.S. Cl............... 82/1 B, 82/2.7, 408/68, 408/69
[51] Int. Cl................. B23b 5/16, B23b 13/00
[58] Field of Search...... 408/67, 68, 69, 70; 10/4, 9, 10/21, 31, 165; 82/1 B, 2.7

[56] References Cited
UNITED STATES PATENTS
354,089 12/1886 Beecher................... 408/69
1,219,803 3/1917 Brightman................ 408/67

*Primary Examiner*—Francis S. Husar
*Attorney, Agent, or Firm*—Carl F. Schaffer et al.

[57] ABSTRACT

A machine for finishing parts, such as welding tips, is disclosed. A driven spindle and cutting tool attached to the spindle are carried by a support over a work table which receives individual parts. The spindle and cutting tool are movable from an upper position to a lower, finishing position against a part. A feeding mechanism below the work table transfers the parts sequentially to a chucking mechanism which retains a part in a fixed finishing position beneath the cutting tool. A chute transfers finished parts away from the machine. A fluid control system is provided for automatic, sequential operation of the feeding and chucking mechanisms.

5 Claims, 7 Drawing Figures

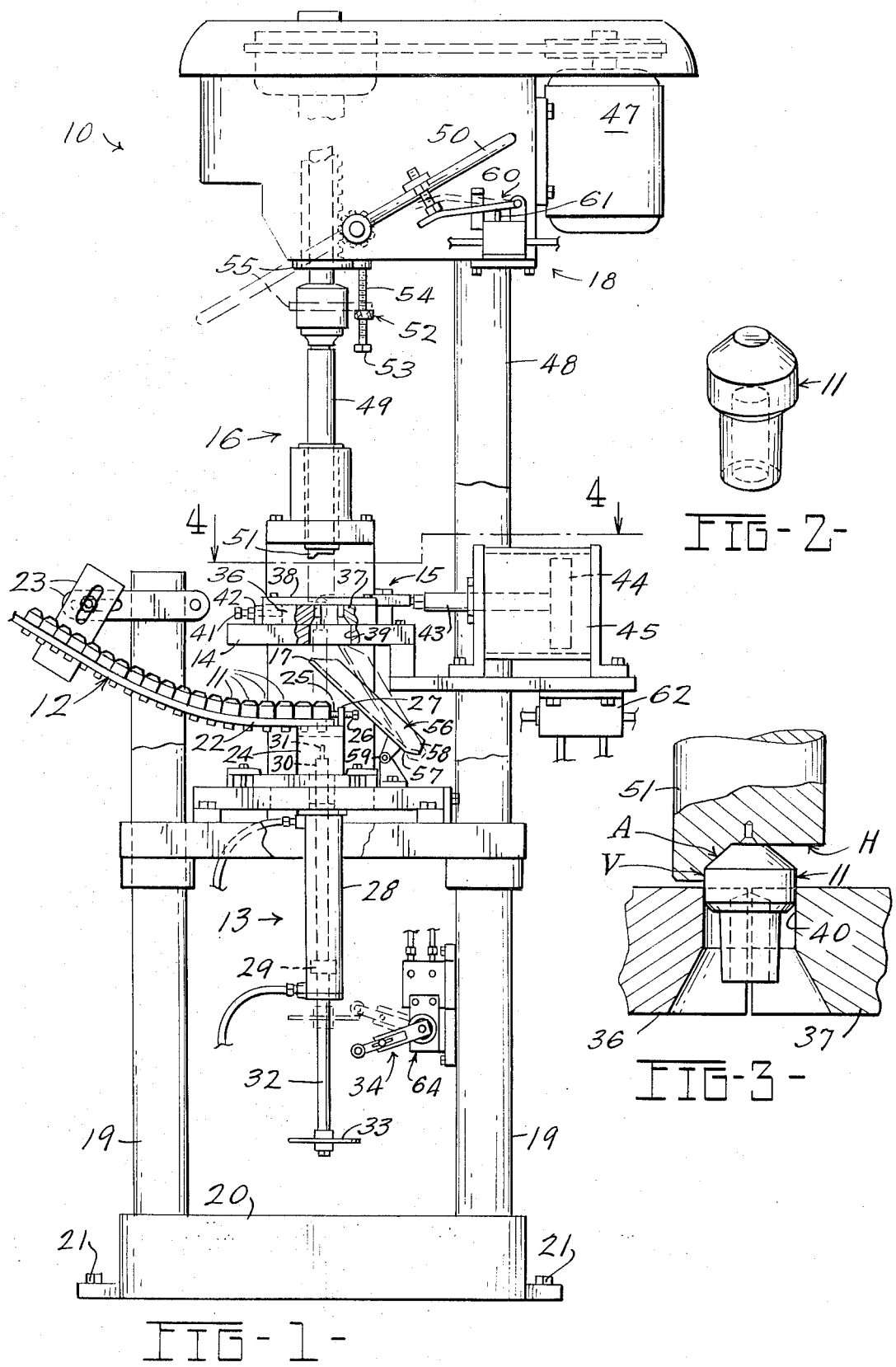

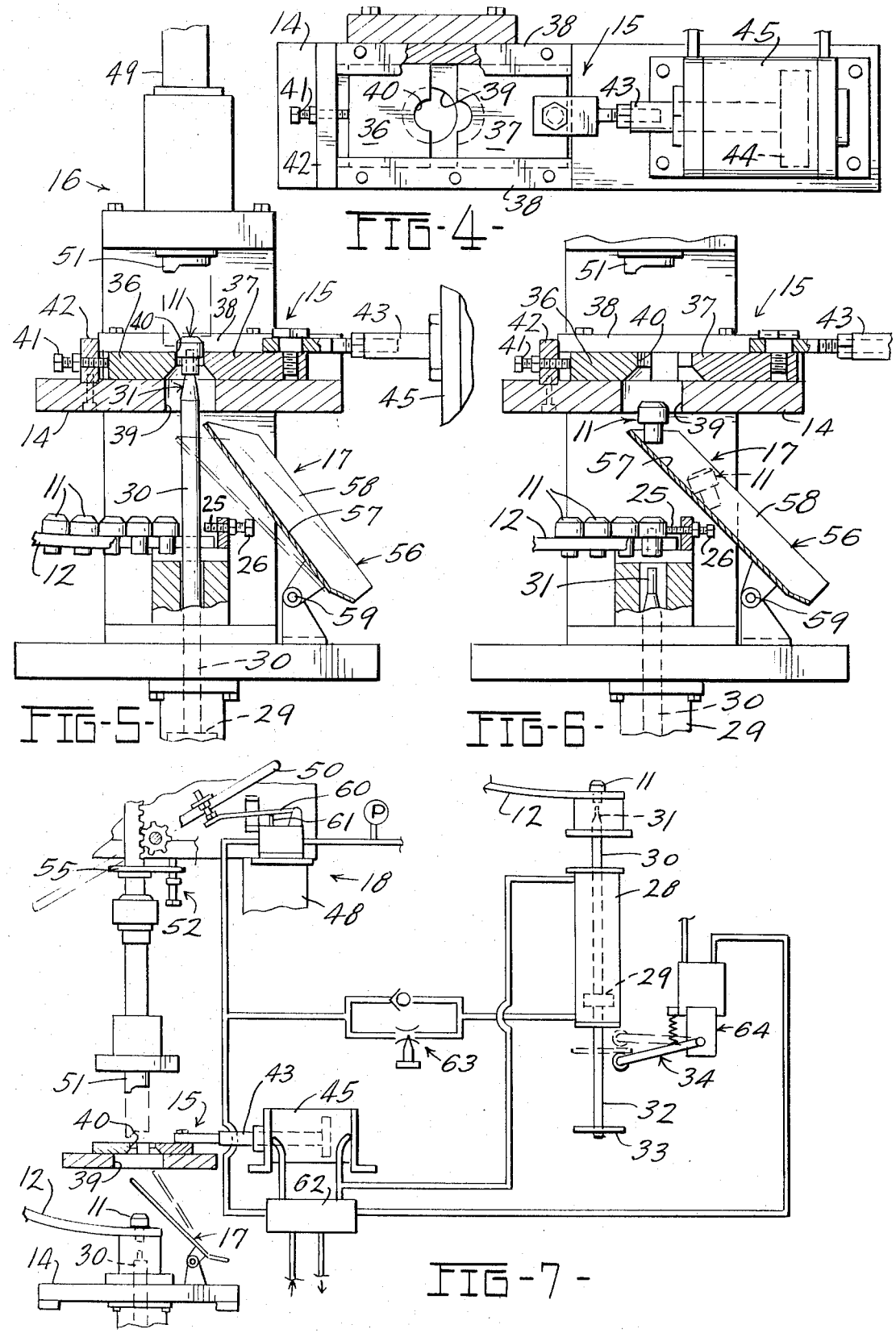

MACHINE FOR FINISHING PARTS

BACKGROUND OF THE INVENTION

Automatic welding machines, used in mass production sheet metal forming operations, utilize numerous welding tips to effect spot welds. These welding tips are generally conically shaped, hollow, non-ferrous bodies which are placed in or over electrode holders on a welding machine. The welding tips are placed in contact with the parts to be welded. The electrode is energized and a spot weld under the welding tip results.

The end portion of the welding tip which contacts the welding material is tapered to the precise desired size of the spot weld to be placed on the sheet metal work. Continued operation of the welding machine in large production operations, such as automobile body plants, causes extreme corrosion and blunting of the welding tip. As the tip is blunted, the cross-sectional area of the spot weld becomes increasingly large, causing a resultant waste of welding material and undesired sloppy weld joints.

It has been a common practice in assembly operations to discard eroded welding tips. Because a large assembly operation requires hundreds of these tips during the assembly of sheet metal bodies, the practice of discarding an eroded welding tip is costly. The present invention provides a means for restoring these welding tips to their original desired taper in a simple and inexpensive manner. The welding tip restored by the machine of the present invention may be used several times before replacement with a new tip is necessary.

SUMMARY OF THE INVENTION

The invention comprises a machine for finishing parts such as welding tips. The machine comprises a frame and a vertically extending support which carries a driven spindle and a shaped cutting tool attached to the spindle over a work table. The spindle is connected to the support for movement from an upper position to a lower finishing position against the workpiece. An inclined magazine below the table conveys the parts by gravity against an abutment above a feeding rod. The feeding rod elevates the workpiece through a hole in the table to a chucking mechanism in a finishing position below the cutting tool. Elevation of the feeding rod causes actuation of the chucking mechanism which engages and retains the workpiece. The feeding rod then retracts below the magazine. The driven spindle is lowered to its finishing position which is set at a predetermined height by an adjustable stop mechanism. The part is finished by the shaped cutting tool, and then released by the chucking mechanism. The released part then falls by gravity through the hole in the table and down an ejector chute pivotally attached to the frame for movement from under the hole when the feeding rod is elevated. A fluid driven control mechanism provides sequential automatic operation of the feeding and chucking mechanisms.

BRIEF DESCRIPTION OF THE DRAWINGS

FIG. 1 is an elevational view of the finishing machine of the present invention;

FIG. 2 is a perspective view of an eroded welding tip to be finished by the machine of the present invention;

FIG. 3 is a cross-sectional view of a welding tip being finished by the machine of FIG. 1;

FIG. 4 is a detail view of a chucking mechanism of the machine of the present invention taken along line 4—4 of FIG. 1;

FIG. 5 is a detail view of the machine of the present invention, showing details of the feeding rod and ejector chute on an enlarged scale;

FIG. 6 is the same view as FIG. 5 except with an ejector chute in position for receiving a finished welding tip; and FIG. 7 is a schematic view of the fluid control system of the present invention.

DESCRIPTION OF THE PREFERRED EMBODIMENT

Referring first to FIG. 1, a machine 10 for finishing welding tips 11 according to the present invention is shown. The machine 10 generally comprises a magazine 12 for serially advancing the welding tips 11; a feeding mechanism 13 for lifting a single welding tip 11 from the magazine 12 to a finishing position A on a work table 14; a chucking mechanism 15 for retaining that tip 11 in the finishing position A; a driven cutting mechanism 16 which is movable from an upper position to a cutting position against the chucked welding tip 11; an ejector chute 17 for delivering the finished welding tip away from the machine 11 to a receiving container (not shown); and a control mechanism 19 (shown schematically in FIG. 7) for sequentially operating the feeding and chucking mechanisms. The machine 10 is supported by a vertical frame 19 connected to a base 20 which is secured to a floor by bolts 21. The components connected to the frame comprise:

The magazine 12

Referring to FIG. 1, the magazine 12 comprises an inclined, grooved track 22 connected to the frame 19 at an upper end by brackets 23 and at a lower end by a guide bearing 24. An adjustable abutment 25 comprising a set screw 26 is threadably attached to a flange 27 on the guide bearing 24 across the downward-most end of the track 22. The track 22 is inclined at a sufficient angle to advance individual welding tips placed therein by gravity against the abutment 25.

The feeding mechanism 13

A cylinder 28 is connected below the guide bearing 24. A piston 29 is movable within the cylinder 28, through actuation of a source of fluid pressure from a retracted position to an extended position. A feeding rod 30, connected to an upper side of the piston 29, extends vertically from the cylinder 28 into and through the guide bearing 24 supporting the lower end of the inclined magazine 12. Adjustment of the set screw 26 of the abutment 25 locates an advanced welding tip 11 in axial alignment with the feeding rod 30. A taper 31 is provided on the feeding rod 30 to seat within the hollow welding tip 11. As is shown in FIGS. 5 and 6, movement of the piston 29 toward its extended position raises the feeding rod 30 into communication with an advanced welding tip 11, vertically transporting that welding tip 11 from the magazine 12 to the finishing position A on the work table 14.

Referring to FIG. 1, a cam rod 32 connected to a lower side of the piston 29 extends downwardly through the cylinder 28. A cam plate 33 is threadably attached for axial adjustment along the cam rod 32. The cam plate 33 strikes the cylinder 28 when the piston is moved vertically to its extended position, thus limiting the travel of the feeding rod 30. Upward and downward adjustment of the cam plate 33 thus provides means of adjusting the desired vertical location of the finishing position A of the welding tip 11. As will be discussed below the cam plate also strikes a limit switch 34 which actuates the chucking mechanism 15.

The chucking mechanism 15

Referring to FIG. 4, the chucking mechanism 15 comprises a fixed jaw 36 and an opposed, driven jaw 37 movable to a closed position within flanged tracks 38 secured to the work table 14. A hole 39 in the work table 14 is located between the flanged tracks 38 in axial alignment with the feeding rod 30. The jaws 36 and 37, in the closed position, define an annular socket 40 for receiving a welding tip 11 placed therebetween.

The fixed jaw 36 is adjustable within the flanged tracks 38 by means of a set screw 41 threaded to a plate 42 connected to the table 14. Adjustment of the fixed jaw 36 brings the annular socket 40 into alignment with the hole 39. The driven jaw 37 is movable toward and away from the fixed jaw 36 by a drive rod 43 connected to a fluid piston 44 within a cylinder 45. Introduction of fluid under pressure to one side of the piston 44 moves the driven jaw 37 to the closed position; introduction of fluid on the opposite side of the piston 44 opens the driven jaw 37.

When a welding tip 11, carried on the feeding rod 30, is raised through the hole 39 to the finishing position A, the driven jaw 37 moves to the closed position, engaging the welding tip 11 within the socket 40. The welding tip 11 is retained within the socket 40 for finishing by the cutting mechanism 16.

The cutting mechanism 16

Referring to FIG. 1, the cutting mechanism comprises an electric motor 47 connected to a vertical support 48 which extends from the frame 19. The electric motor 47 drives a spindle 49 over the work table 14. The spindle 49 is in engagement with a crank handle 50 for movement from an upper position to a cutting position adjacent the finishing position A of the chucked welding tip 11.

A shaped cutting tool 51 of any suitable hard machining metal is connected to the spindle 49. As shown in FIG. 3, the cutting tool of the present embodiment comprises a horizontal cutting surface $h$, an angular cutting surface $a$, and a vertical cutting surface $v$. Movement of the rotating spindle 49 into the cutting position carries the cutting tool 51 into contact with a chucked welding tip 11. The cutting surfaces $h$, $a$, $v$ engage corresponding surfaces of the generally conically shaped welding tip 11 to effect removal of the corroded areas shown as they typically occur in FIG. 2.

An adjustable stop 52 engages a forked collar 55, carried on the spindle 49, when the spindle is lowered to the cutting position. The stop 52 comprises a set screw 53 threaded to a vertically extending shank 54. Movement of the forked collar 55 against the set screw 53 limits the maximum downward travel of the spindle 49. As will be apparent to those skilled in the art, adjustment of the set screw 53 therefore determines the location of the cutting position of the cutting tool 51.

Because the upper limit of travel of the feeding rod 30 and the lower limit of travel of the cutting tool 51 are positively determinable by adjustable stopping means already described, the amount of material to be removed from a chucked welding tip 11 by the cutting tool 51 can be precisely determined. Further, a welding tip which has become undersized through repeated refinishing will be too short to be contacted by the cutting tool 51. Therefore an undersized welding tip which is no longer suitable for use can be easily detected by an operator of the machine 10.

The ejector chute 17

Referring to FIGS. 5 and 6, the ejector chute 17 comprises an inclined slide 56 having a floor 57 and sidewalls 58. The ejector chute 17 is pivotally attached by hinges 59 to the work table 14 for movement into and out of a receiving position under a chucked welding tip 11. With the ejector chute 17 in a receiving position, a finished welding tip can be released by the chucking mechanism 15, permitting the welding tip 11 to fall through the hole 39 and down the slide 56 to a collecting container, (not shown). As the feeding rod 30 carrying a next welding tip 11 moves upwardly from the magazine 12, the tip 11 is driven against the floor 57 of the ejector chute 17. Continued movement of the feeding rod 30 pivots the ejector chute 17 out of position to permit the carrying of the welding tip 11 to the chucking mechanism. When the feeding rod 30 retracts, the ejector chute 17 returns by gravity to its receiving position which is located by a fixed part of the machine which stops further downward movement of the chute 17, as seen in FIG. 6.

The control mechanism 18

Referring to FIG. 7, a schematic diagram of the control mechanism 18 is shown. In the preferred embodiment of the present invention, the control system is pneumatic-operating from a source of pressurized air (not shown). The mechanism 18 comprises an actuator plunger 60 which intercepts the rotatable crank handle 50 when the handle is turned to return the spindle 49 to the upper position. The plunger 60 is connected to an actuator valve 61 which is in an air pressure line. After the cutting tool 51 removes a predetermined desired amount of corroded material from the chucked welding tip 11, and the forked collar 55 strikes the set screw 53, as described, the crank handle is moved to raise the spindle 49. When the crank handle 50 strikes the plunger 60, the actuator valve 61 opens to (a) admit air under pressure to a pilot valve 62 which directs the air to one side of the chucking cylinder 45 to open the chucking mechanism 15 and (b) to charge a timed bleed valve 63 which admits air to the feeding rod cylinder 28. Opening of the chucking mechanism 15 releases the finished welding tip 11 which falls down the ejector chute 17 as described. Air pressure to the feeding rod cylinder 28 extends the feeding rod 30 to carry an advanced welding tip 11 from the magazine 12 to the finishing position A as described.

As the feeding rod 30 approaches the finishing position A, the cam plate 33 connected to the feeding piston 29 strikes the limit switch 34 which actuates a limit valve 64. Actuation of the limit valve 64 admits air to an opposite side of the chucking piston 45 to close the driven jaw 37 against the fixed jaw 36, gripping a fed welding tip 11 within the annular socket 40.

After a predetermined period of time, the timed bleed valve 61 releases pressurized air from the feeding piston 29, causing the feeding rod 30 to retract and placing the ejector chute 17 in a receiving position as described above. The chucked welding tip 11 is then finished by the cutting tool 51 until the collar 55 again strikes the set screw 53. The handle 50 is then rotated to strike the plunger 61 to repeat the feeding and chucking cycles of the machine. Means are therefore provided for sequentially advancing, feeding, finishing, and ejecting welding tip parts from the finishing position.

Various modifications of the preferred embodiment described above will be apparent to those skilled in the art and may be made without departing from the spirit and scope of the following claims.

What I claim is:

1. A machine for finishing parts comprising a frame, a vertically extending support member connected to said frame, means connected to said support member for finishing individual parts, means for moving said finishing means from a first position to a second finishing position against a part to be finished comprising a rotary driven spindle, a shaped cutting tool connected to said spindle, gearing means for moving said spindle from its said first position to its said finishing position and stop means for adjustably locating said finishing position, drive means connected to said support member for rotating said finishing means, a table connected to said frame for receiving one of the parts in a finishing position, means on said table for chucking a part in said finishing position, a magazine connected to said frame for conveying a part, feeding means reciprocatable from a lower position below said magazine to an upper position adjacent said chucking means for feeding a part into said finishing position, means for ejecting a finished part from said machine, and cooperating control means for sequentially: (1) reciprocating said feeding means from its said lower position to its said upper position, (2) actuating said chucking means, (3) reciprocating said feeding means to its said lower position, (4) deactivating said chucking means, and (5) reactivating said feeding means.

2. A machine for finishing parts comprising a frame; means on said frame for sequentially feeding individual parts to be finished; means responsive to the completion of said sequential feeding for chucking the fed part; means on said frame for moving against and finishing the chucked part; means responsive to the completion of motion of said finishing means for releasing said chucking means; means on said frame for ejecting the released part from said machine; and means responsive to the completion of motion of said finishing means for sequentially feeding a next individual part to be finished.

3. A machine for finishing parts according to claim 1 wherein said chucking means comprises a guide track connected to said table, an adjustable jaw member secured within one side of said guide track, and a driven jaw member movable within an opposite side of said guide track whereby closing of said movable jaw against said adjustable jaw engages a work piece fed therebetween.

4. A machine for finishing parts according to claim 1, wherein said feeding means comprises a cylinder connected to said frame, a fluid actuated piston within said cylinder, a rod connected to said piston, and a seat on one end of said rod for retaining and transporting a part to be finished.

5. A machine for finishing parts according to claim 1, wherein said control means comprises: actuating means for initiating movement of said feeding means, and opening said chucking means; a contact surface on an end of said feeding rod, a limit switch engageable by said contact surface for closing said chucking means; and deactuating means for reciprocating said feeding means into its said lower position.

* * * * *